US012555279B2

(12) United States Patent
Li

(10) Patent No.: US 12,555,279 B2
(45) Date of Patent: Feb. 17, 2026

(54) METHOD AND APPARATUS FOR PICTURE GENERATION AND STORAGE MEDIUM

(71) Applicant: BOE TECHNOLOGY GROUP CO., LTD., Beijing (CN)

(72) Inventor: Ang Li, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 91 days.

(21) Appl. No.: 18/340,099

(22) Filed: Jun. 23, 2023

(65) Prior Publication Data

US 2023/0343000 A1    Oct. 26, 2023

Related U.S. Application Data

(63) Continuation of application No. 17/511,176, filed on Oct. 26, 2021, now Pat. No. 11,783,520.

(30) Foreign Application Priority Data

Mar. 9, 2021   (CN) .......................... 202110258525.5

(51) Int. Cl.
*G06T 11/20*   (2006.01)
*G06T 11/60*   (2006.01)
*G09G 5/393*   (2006.01)

(52) U.S. Cl.
CPC .............. *G06T 11/20* (2013.01); *G06T 11/60* (2013.01); *G09G 5/393* (2013.01)

(58) Field of Classification Search
CPC .......... G06T 11/20; G06T 11/60; G09G 5/393
See application file for complete search history.

(56) References Cited

U.S. PATENT DOCUMENTS 5,987,256 A * 11/1999 Wu .................... G06F 9/451
717/146
6,583,892 B2 * 6/2003 Tanaka .................. G06F 3/1224
358/1.9

(Continued)

FOREIGN PATENT DOCUMENTS

CN     110347463 A     10/2019
CN     111223155 A      6/2020

(Continued)

OTHER PUBLICATIONS

Advisory Action for U.S. Appl. No. 17/511,176 mailed May 9, 2023, 3 pages.

(Continued)

*Primary Examiner* — Jin Cheng Wang
(74) *Attorney, Agent, or Firm* — Myers Bigel, P.A.

(57) ABSTRACT

This disclosure provides a picture generation method, apparatus, electronic device and storage medium. The picture generation method includes acquiring a plurality of content elements contained in a design of a target picture, the content elements having respective attribute information, in response to a drawing instruction, parsing the content elements to obtain one or more graphic elements for each of the plurality of content elements, each graphic element having an associated graphic parameter that corresponds to the attribute information of a respective content element, drawing the graphic elements according to the associated graphic parameters to obtain content element pictures for respective content elements, and combining the obtained content element pictures to generate the target picture.

15 Claims, 5 Drawing Sheets

(56) References Cited

U.S. PATENT DOCUMENTS

| | | | |
|---|---|---|---|
| 6,654,139 B1* | 11/2003 | Yokoe | G06K 15/1857 |
| | | | 358/1.15 |
| 10,311,130 B1 | 6/2019 | Kumar | |
| 2003/0184773 A1* | 10/2003 | Borchers | G06K 15/1848 |
| | | | 358/1.9 |
| 2013/0222418 A1 | 8/2013 | Campbell et al. | |
| 2014/0078156 A1* | 3/2014 | Carroll | G06T 1/60 |
| | | | 345/505 |
| 2014/0347681 A1* | 11/2014 | Kiuchi | G06T 11/60 |
| | | | 358/1.9 |
| 2015/0015571 A1* | 1/2015 | Yuda | G06T 15/005 |
| | | | 345/419 |
| 2015/0062136 A1* | 3/2015 | Yamauchi | G06T 11/20 |
| | | | 345/522 |
| 2015/0206332 A1* | 7/2015 | Matsui | G04G 9/08 |
| | | | 345/641 |
| 2015/0269131 A1 | 9/2015 | Minematsu et al. | |
| 2016/0259772 A1* | 9/2016 | Kato | G06F 40/103 |
| 2016/0261929 A1 | 9/2016 | Lee et al. | |
| 2016/0286181 A1 | 9/2016 | Kawamura | |
| 2017/0053196 A1* | 2/2017 | Nagasaka | G06K 15/1813 |
| 2017/0139574 A1* | 5/2017 | Dong | G06F 3/04845 |
| 2017/0140494 A1 | 5/2017 | Marchiori et al. | |
| 2017/0154022 A1* | 6/2017 | Wang | G06F 3/0482 |
| 2017/0178401 A1* | 6/2017 | Agrawal | G06T 15/005 |
| 2017/0286371 A1* | 10/2017 | Helmes | G06F 40/169 |
| 2018/0018751 A1* | 1/2018 | Jiang | G06T 1/20 |
| 2018/0032849 A1* | 2/2018 | Nakata | G06K 15/1864 |
| 2018/0146217 A1 | 5/2018 | Kedenburg, III | |
| 2018/0181846 A1 | 6/2018 | Koziarz et al. | |
| 2018/0288496 A1* | 10/2018 | Ade | G06F 16/168 |
| 2018/0309742 A1* | 10/2018 | Kato | G06F 21/6218 |
| 2019/0012120 A1* | 1/2019 | Watanabe | G06F 3/1247 |
| 2019/0034137 A1 | 1/2019 | Yokoyama | |
| 2019/0172208 A1* | 6/2019 | Fukuoka | G06T 1/20 |
| 2020/0081670 A1 | 3/2020 | Uchida | |
| 2020/0210793 A1 | 7/2020 | Tanaka | |
| 2020/0413423 A1* | 12/2020 | Wang | G06F 1/329 |
| 2021/0241416 A1* | 8/2021 | Cerny | G06F 9/3836 |
| 2022/0050692 A1 | 2/2022 | Dang et al. | |
| 2022/0238061 A1* | 7/2022 | McDaniel | G09G 5/393 |
| 2022/0391084 A1* | 12/2022 | Cheng | G06F 9/451 |

FOREIGN PATENT DOCUMENTS

| | | |
|---|---|---|
| CN | 111666318 A | 9/2020 |
| CN | 112004115 A | 11/2020 |

OTHER PUBLICATIONS

Final Office for U.S. Appl. No. 17/511,176 mailed Feb. 23, 2023, 54 pages.

Non-Final Office Action for U.S. Appl. No. 17/511,176 mailed Aug. 4, 2022, 51 pages.

Office Action corresponding to Chinese patent application 202110258525.5 (Foreign Text, 23 Pages, English Translation Thereof, 12 Pages) (Apr. 2, 2025).

Peng et al. "Application of Java Technology in Two-Dimensional Image Processing", Chinese Journal of Image and Graphics (Sep. 25, 1998).

Office Action corresponding to Chinese Patent Application No. 202110258525.5 (Foreign Text, 14 Pages, English Translation Thereof, 13 Pages) (Oct. 13, 2025).

\* cited by examiner

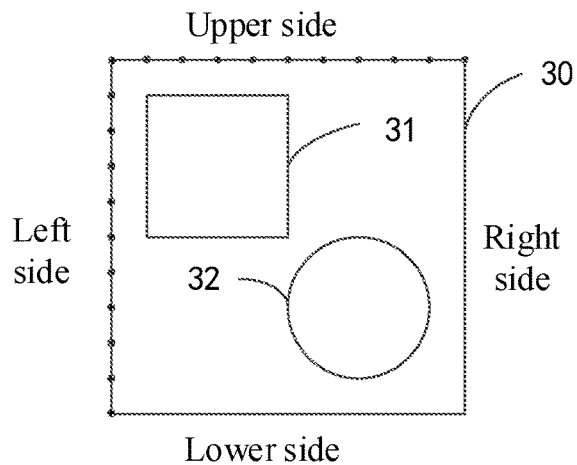
FIG. 3
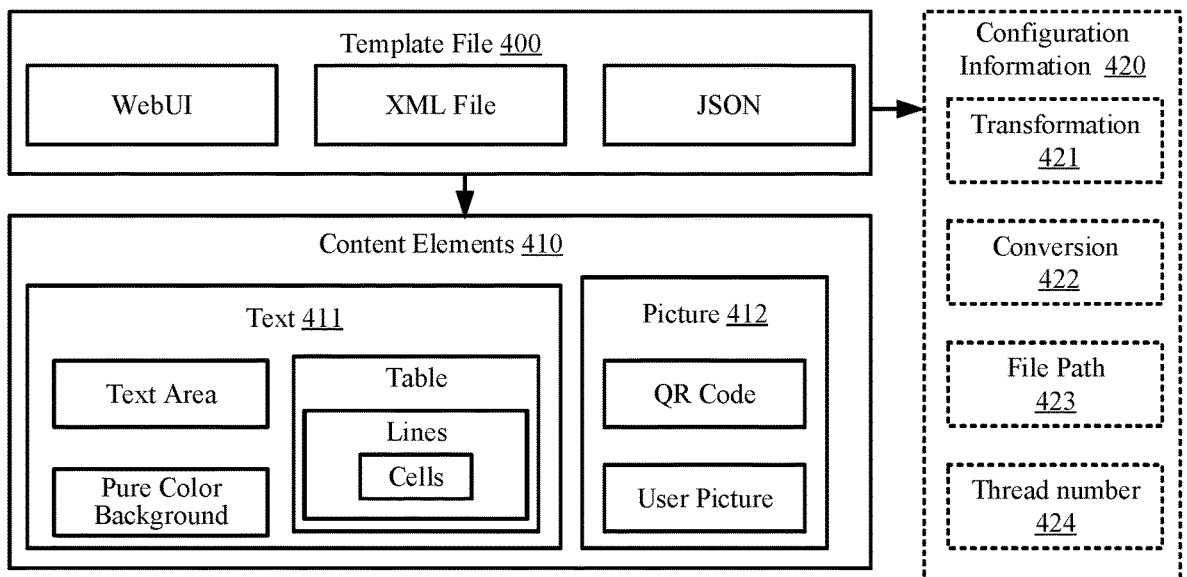
FIG. 4
Acquire configuration information, the configuration information being used for configuring further processing on preliminary picture
Acquire configuration information from template file 511
510
Process the preliminary picture based on the configuration information to generate target picture
520
FIG. 5

METHOD AND APPARATUS FOR PICTURE GENERATION AND STORAGE MEDIUM

RELATED APPLICATION

This application is the Continuation application of U.S. patent application Ser. No. 17/511,176, filed on Oct. 26, 2021, which claims the priority of Chinese patent application No. 202110258525.5 filed on Mar. 9, 2021. The above-identified applications are incorporated herein by reference.

FIELD

This disclosure relates to the field of computer application technology, and in particular to a picture generation method, apparatus and storage medium.

BACKGROUND

With people's increasing awareness of environmental protection and the acceleration of informatization construction, the concept of paperless office has gradually been applied in our daily life. The way in which signs such as house signs and table signs are used has also undergone tremendous changes. For example, companies, enterprises and so on have gradually replaced paper signs with electronic signs. Contents of the electronic signs are usually displayed in the form of pictures. These pictures are generally generated by invoking third-party drawing tools. However, the third-party drawing tools are usually unable to be integrated with application services, so the application services are facing the need of integrating picture generation functions.

Besides, there are also solutions in which pictures are drawn directly in application services by using a Graphics2D tool in the Java native class. However, this kind of drawing tool is not targeted or is quite similar to a sketchpad tool, so a user has to redraw all elements of the pictures every time, which leads to a low drawing efficiency.

SUMMARY

According to a first aspect of this disclosure, a picture generation method is provided. The method comprises: acquiring a plurality of content elements contained in a design of a target picture, the content elements having respective attribute information; in response to a drawing instruction, parsing the content elements to obtain one or more graphic elements for each of the plurality of content elements, each graphic element having an associated graphic parameter that corresponds to the attribute information of a respective content element; drawing the graphic elements according to the associated graphic parameters to obtain content element pictures for respective content elements; and combining the obtained content element pictures to generate the target picture.

Optionally, combining the obtained content element pictures to generate the target picture comprises: combining the obtained content element pictures to generate a preliminary picture; acquiring configuration information, the configuration information being used for configuring further processing of the preliminary picture; processing the preliminary picture based on the configuration information to generate the target picture.

Optionally, the configuration information comprises format conversion information, and the processing the preliminary picture based on the configuration information to generate the target picture comprises: performing format conversion on the preliminary picture based on the format conversion information to generate the target picture.

Optionally, the format conversion information is Electronic Paper Display (EPD) conversion information. The EPD conversion information indicates a data format required by an EPD device for displaying the target picture. Performing format conversion on the preliminary picture based on the format conversion information comprises: converting the preliminary picture into a data format required by the EPD device based on the EPD conversion information.

Optionally, converting the preliminary picture into the data format required by the EPD device based on the EPD conversion information comprises: invoking an EPD conversion service via a target interface to convert the data format of the preliminary picture.

Optionally, after generating the target picture, the method further comprises: determining whether the target picture is to be saved; in response to determining that the target picture is to be saved, extracting from the configuration information a file path for indicating a saving path of the target picture, and saving a picture file of the target picture according to the file path.

Optionally, prior to combining the obtained content element pictures, the method further comprises: determining whether the content elements are to be rendered; in response to determining that at least one of the content elements is to be rendered, acquiring a rendering strategy set for the at least one content element; redrawing the at least one content element according to the set rendering strategy to obtain rendered content element picture(s). The combining the obtained content element pictures comprise combining the rendered content element picture(s).

Optionally, the rendering strategy is set based on a business need with respect to the target picture.

Optionally, acquiring the plurality of content elements contained in the design of the target picture comprises: receiving a template file describing the design of the target picture; and parsing the template file to acquire the plurality of content elements.

Optionally, the template file is parsed to acquire the plurality of content elements and the configuration information.

Optionally, the configuration information comprises at least one of formation conversion information, graphic transformation information, file path or the number of threads.

According to a second aspect of this disclosure, a picture generation apparatus is provided. The picture generation apparatus comprises: an acquisition unit configured to acquire a plurality of content elements contained in a design of a target picture, the content elements having respective attribute information; a parsing unit configured to parse the content elements to obtain one or more graphic elements for each of the plurality of content elements in response to a drawing instruction, each graphic element having an associated graphic parameter that corresponds to the attribute information of a respective content element; an element drawing unit configured to draw the graphic elements according to the associated graphic parameters to obtain content element pictures for respective content elements; and a combining unit configured to combine obtained content element pictures to generate the target picture.

According to a third aspect of this disclosure, an electronic device is provided. The electronic device comprises: a processor and a memory for storing executable instructions. The processor is configured to execute the executable instructions to implement the picture generation method according to the first aspect of this disclosure.

According to a fourth aspect of this disclosure, a non-transitory computer-readable storage medium is provided. The non-transitory computer-readable storage medium has executable instructions stored thereon. When executed by a processor, the executable instructions enable the processor to implement the method according to the first aspect of this disclosure.

BRIEF DESCRIPTION OF DRAWINGS

The above and other features and advantages of this disclosure will become clearer after detailed description of the specific embodiments with reference to the drawings.

FIG. 3 is an exemplary picture according to an embodiment of this disclosure;

FIG. 4 exemplarily shows a template file according to an embodiment of this disclosure;

FIG. 5 is an exemplary flow chart of a method for processing a picture based on configuration information according to an embodiment of this disclosure;

DETAILED DESCRIPTION OF EMBODIMENTS

Figure 1:
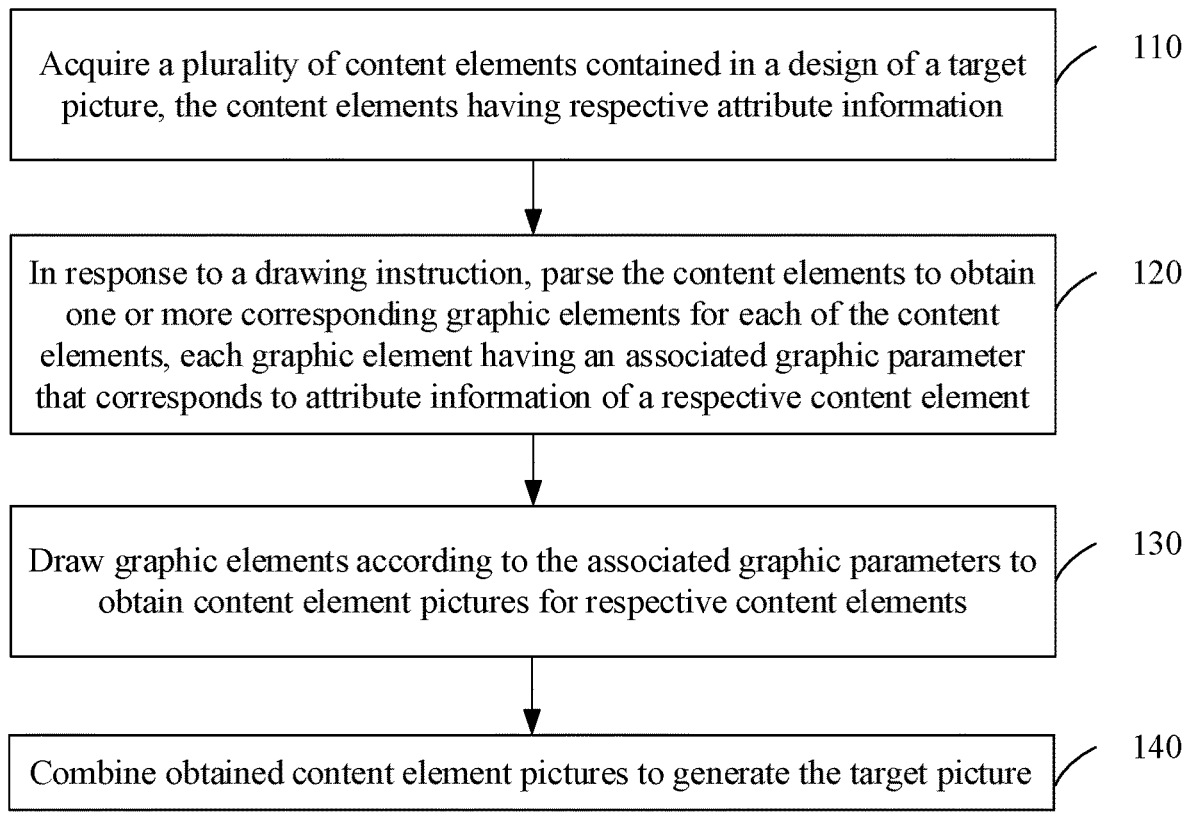
FIG. 1 is an exemplary flow chart of a method according to an embodiment of this disclosure.

In order that one having ordinary skills in the art can better understand the technical solutions of this disclosure, the technical solutions in the embodiments of this disclosure will be described clearly and completely as follows with reference to the drawings.

It should be noted that terms such as "first" and "second" in the description, the Claims and the drawings of this disclosure are used to distinguish similar objects rather than necessarily describe a specific order or sequence. It should be understood that such numbers may be exchanged where appropriate, so that the embodiments of this disclosure described herein can be implemented in an order other than those illustrated or described herein.

It should also be understood that the term "comprise" indicates the existence of the described features, wholes, steps, operations, elements and/or components, but does not exclude the existence or addition of one or more other features, wholes, steps, operations, elements and/or components.

With the development of paperless office and the advancement of informatization construction, companies, enterprises and so on are having an increasing demand for content customization and custom control of electronic signs. In related arts, contents of the electronic signs are usually displayed in the form of pictures. In some solutions, these pictures are generally generated by invoking third-party drawing tools such as PhotoShop, ProcessOn, etc. Although such drawing tools can both draw complicated pictures and support generation of various pictures, the drawing procedure is so cumbersome that manual operations are required repeatedly to complete the drawing of a large batch of pictures. Moreover, such third-party drawing tools are usually unable to be integrated with application services.

In other solutions, pictures may be drawn by using Java-based third-party drawing tools (e.g., drawing tools such as JViews, Edraw, etc.). However, such drawing tools are usually not open source and generally independent, so it is still difficult to integrate these tools with application services.

Besides, pictures may also be drawn directly in the application services by using a Graphics2D tool in the Java native class. However, this kind of drawing tool is quite similar to a sketchpad tool, so a user has to redraw all elements in the pictures every time, which leads to a low drawing efficiency.

To solve the above problems, the embodiments of this disclosure provide a picture generation method which achieves drawing of a target picture by parsing content elements for describing design contents of the target picture. As compared with an existing picture generation approach in the related arts, the method according to the embodiments of this disclosure improves the drawing efficiency.

FIG. 1 shows a flow chart of a picture generation method according to an exemplary embodiment. As shown in FIG. 1, the method may comprise steps as follows.

In step 110, a plurality of content elements contained in a design of a target picture are acquired. The content elements have respective attribute information.

A content element, as used herein, may refer to an individual constituent part that can independently describe a specific content of a specific area in a picture. Exemplarily, examples of a content element may be text (e.g., strings), picture, QR code (the content of QR codes is usually in a text form), table (e.g., including a head and a body, as well as text contained in cells thereof) etc. Attribute information of a content element may comprise one or more of type, position, color, size, font, orientation and so on. In some embodiments, attribute information that are shared by content elements may comprise for example x-axis coordinate and y-axis coordinate for indicating a position within a picture, the width and height of an occupied region, whether a border is contained, or the like. Additionally, attribute information of a text element may comprise font, font size, color, whether it is in italic, whether it is in bold, whether it is underlined, etc. Attribute information of a table element may comprise row height and column width of the head, row height and column width of the body, and attributes of the text in the head and body are the same as those of the text element.

Figure 2:
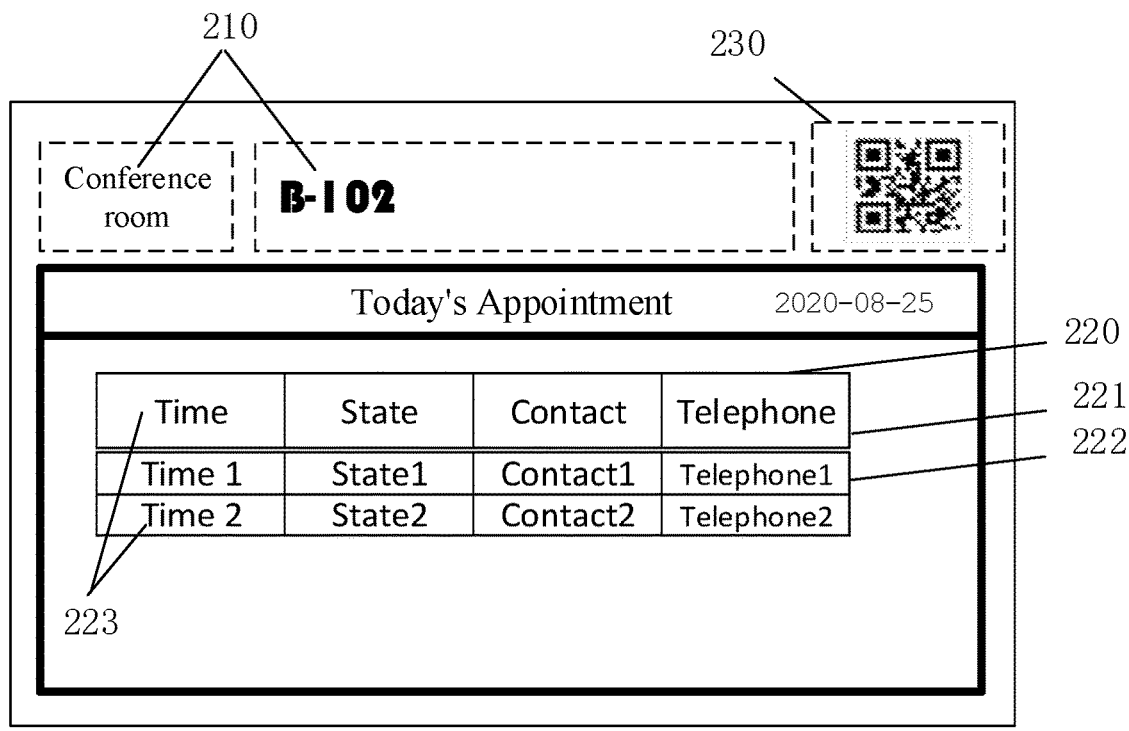
FIG. 2 is an exemplary picture design according to an embodiment of this disclosure.

FIG. 2 shows an exemplary picture design that may be used for displaying a digital sign according to an embodiment of this disclosure. As shown in FIG. 2, the picture design comprises multiple types of content elements, including text elements "conference room" and "B-102" 210, table element 220 and QR code element 230 etc. Each content element has its own attribute. For example, text elements "conference room" and "B-102" have the same font attribute, font size attribute, etc., but they have different position attributes, wherein the position of "conference room" is on the left of "B-102". In the table element 220, the head 221 and the body 222 have the same column width attribute but different row height attributes, and the text elements 223 in the head 221 and the body 222 have the same font attribute but different font size attributes.

In some embodiments, the content elements may further comprise a plurality of content sub-elements. FIG. 3 shows an exemplary picture. As shown in FIG. 3, picture 30 comprises two sub-elements, which are respectively a square and a circle. The attribute information of the square and the attribute information of the circle both comprise a position attribute. Exemplarily, the position attribute assigned to the square may be 10 units from the left side, 50 units from the right side, 10 units from the upper side, and 50 units from the lower side of the picture. The position attribute assigned to the circle may be 50 units from the left side, 10 units from the right side, 50 units from the upper side, and 10 units from the lower side of the picture. Thereby, the square and the position attribute of the square constitute a square element (graphic sub-element), and the circle and the position attribute of the circle constitute a circle element (graphic sub-element). Square element 31 is located at the upper left corner of picture 30, and circle element 32 is located at the lower right corner of picture 30. The length of one unit of the position attribute is preset based on a length of a corresponding side in the picture. Exemplarily, if the length of the left side of the picture is 100 cm, and the length of the left side of a sub-element is 5 units, the length of the left side of the sub-element is 5 cm.

In such an embodiment, the acquisition of the content elements may be performed by obtaining the content elements as a whole. Additionally or optionally, the acquisition of the content elements may also be performed by acquiring each content sub-element (together with its attribute information) of the content elements separately.

Since the content sub-elements obtained by splitting the content elements are more likely to correspond to basic graphics supported by various drawing tools, to acquire each content sub-element separately may accelerate the speed of element parsing in the subsequent procedure and thus improve the drawing efficiency.

In some embodiments, content elements contained in a target picture design may also be obtained by acquiring a template file and parsing the template file. Each template file may correspond to a picture design, and be used to describe a specific combination of a set of specific content elements in the picture design. A template file may describe a plurality of content elements contained in the target picture and their manifestations in the target picture, such as layout, color scheme, or other variables that can be applied to the content elements.

The template file may be preset, for example, the template file may be a default template file of a designer system for picture design. Alternatively or additionally, a template file may also be generated dynamically based on a user need. Exemplarily, the template file may be generated by a user using for example WebUI framework. A file format of a template file may be a file format that can be parsed, e.g., extensible markup language (XML) format, JSON format and so on.

In some embodiments, a template corresponding to the template file may be created or modified by a designer. For example, the size of the template and the attributes of elements in the template, e.g., position, color, font, etc., may be modified. The template created by the designer may be exported in XML or JSON format.

Creation or modification f a template with a designer allows a user to intuitively view a designed picture that is relatively close to a picture with final effect.

FIG. 4 exemplarily illustrates a template file 400. As shown in FIG. 4, content elements 410 may be acquired by parsing the template file 400. The content elements 410 may comprise a text element 411 and a picture element 412. The text element is illustrated to include a text area element, a pure color background element, and a table element. The table element has lines and cells. The picture element 412 is illustrated to include QR code and user picture. Although not shown, it would be understood that the template file further defines attribute information of respective content elements, and the attribute information corresponding to each content element may be acquired by parsing the template file.

Returning to FIG. 1, in step 120, in response to a drawing instruction, the content elements are parsed to obtain one or more graphic elements for each of the plurality of content elements. Each graphic element has an associated graphic parameter that corresponds to the attribute information of a respective content element.

In some embodiments, the graphic elements may be basic graphics drawn by a drawing tool. As such, graphic elements corresponding to content elements may be obtained in accordance with the correspondence relations between the content elements and the basic graphics.

The associated graphic parameters of the graphic elements may be parameters for enabling the drawn graphic elements to be presented in a desired way. The graphic parameters may be generated based on the attribute information of the content elements. Exemplarily, in drawing the content elements, the graphic parameters are used to set drawing parameters of the drawing tool such that the drawn graphics and the content elements have the same attributes.

In an example, when a content element is a text element, since the text element is a graphic that can be drawn, corresponding text graphic can be obtained directly by parsing the text element, and the attribute information of the text element can be correspondingly translated into graphic parameters of the text graphic. For example, the color attribute of the text element may be used as a color parameter of the corresponding text graphic for setting a color value of the text graphic in drawing the text graph.

In another example, when the content element is a table element, since the table element do not directly correspond to a graphic element, it may be parsed and split into a plurality of text graphics, and position parameters relating to position may be generated based on position attributes of the table elements and relative position relationships between the text graphics for respective text graphics. The position parameter may indicate the relative displacement of position coordinates among multiple text graphics, or it may be the absolute position coordinates of the multiple text graphics. The position parameter of each text graphic may indicate a position where the corresponding text graphic is drawn, thereby creating the table elements.

In step 130, the graphic elements are drawn according to the associated graphic parameters to obtain content element pictures for respective content elements. Here, a content element picture is a picture that expresses content described by a respective content element in a graphical representation.

The one or more graphic elements may be drawn using a drawing tool. In an example, when the content element is a text element, the corresponding text graphic and associated color parameter, position parameter, font parameter, font size parameter, etc. can be obtained by parsing the text element. According to the obtained graphic parameters, the drawing tool may set the color value, position coordinates, font and font size for the text graphic so as to draw the text graphic. Optionally, when the text element comprises different text strings in different positions, two corresponding text graphics and associated graphic parameters can be obtained by parsing the text element. In this scenario, the drawing tool draws the text graphics according to respective graphic parameters to complete drawing of the text element and obtain a text element picture, i.e., pictorialized text. In another example, when the content element is a table element, a plurality of text graphics and associated graphic parameters can be obtained by parsing the table elements. The corresponding text graphics may be drawn using the drawing tool according to the graphic parameters in light of the order of respective cells in the table to complete drawing of the table element and obtain a table element picture, i.e., a pictorialized table.

Optionally, layers may also be set for the content elements. In such an embodiment, each content element is drawn in light of the order of the layers of the content elements.

Optionally, the graphic elements may be drawn using a drawing tool of Java.awt package in Java Development Kit (JDK). The drawing tool is for example Graphics2D in Java.awt package. Graphics2D may draw various 2D basic graphics, including line segment, polyline, polygon, text, etc.

For example, the following codes may be used to invoke Graphic s2D in order to set a background color.
  if (getBgColor( )!=null){// if the attribute of background color is not null g2d.setBackground(getBgColor( );}
  // generate background color based on the attribute of background color.

In this embodiment, since Graphics2D is a class in native JDK, it has a good cross-platform performance. Moreover, the Graphics2D tool can support the drawing of various basic graphics, so it has a strong functionality.

In step 140, the obtained content element pictures are combined to generate the target picture. The drawing tool may draw the content elements on a canvas. After drawing are completed for all content elements, canvases on which the content elements are drawn, i.e., canvases containing the content element pictures, may be combined to generate the target picture.

According to the embodiments of this disclosure, descriptive contents of a target picture design are split into content elements and the content elements are parsed to obtain graphic elements so as to perform picture drawing, thereby enabling automatic drawing. As compared with the picture generation approach in which pictures are drawn manually by a user, the drawing efficiency is improved.

In some embodiments, after the target picture is generated, further processing on the generated picture may also be performed as desired. In such embodiments, the generated picture may be processed as a preliminary picture to obtain a processed picture. FIG. 5 shows an exemplary flow chart of a method for processing a picture based on configuration information according to an embodiment of this disclosure.

As shown in FIG. 5, in step 510, configuration information is acquired, the configuration information being used for configuring further processing on the preliminary picture. In step 520, the preliminary picture is processed based on the configuration information to generate the target picture.

Optionally, in step 511, the configuration information may be obtained by parsing a template file. Continuously referring to FIG. 4, FIG. 4 exemplarily shows on the right configuration information that can be acquired by parsing the template file, including one or more of e.g., graphic transformation information 421, format conversion information 422, file path 423, and thread number 424.

Additionally or alternatively, the configuration information of a picture may be acquired in other manners, e.g., by inputting in a user interface by a user, or by parsing a configuration file separate from the template file.

The graphic transformation information may be used to control basic geometric transformation of a picture generated based on content elements, including translation, rotation, scaling and so on. By containing configuration information about graphic transformation, the presentation of pictures can be flexibly changed so as to better adapt to a desired presentation effect.

The format conversion information may be used to control conversion of the data format of a picture generated based on the content elements. For example, in a scenario where the target picture is to be displayed on an EPD device, since different EPD devices require different data formats, it may be required to convert the data format according to requirements of the EPD devices. In such a scenario, the configuration information may comprise EPD conversion information for indicating a data format required by an EPD device for displaying the target picture.

The file path is used to indicate a saving (including e.g., cache) path of a picture. In some embodiments, after picture drawing and processing are completed, the generated target picture may be pushed to a terminal device. During the drawing and pushing, the picture may be transferred in the form of Base64 encoding or binary stream. The picture information will not be saved additionally if a save setting is not enabled. In such an embodiment, a user may be provided with an option of enabling a save setting and in turn a file path for saving a picture file for the picture. In this way, after the user enables the save setting, the user can save a drawn picture so as to preview an effect of the picture. If he/she is not satisfied with the picture, the picture drawing and pushing may be carried out again.

Figure 6:
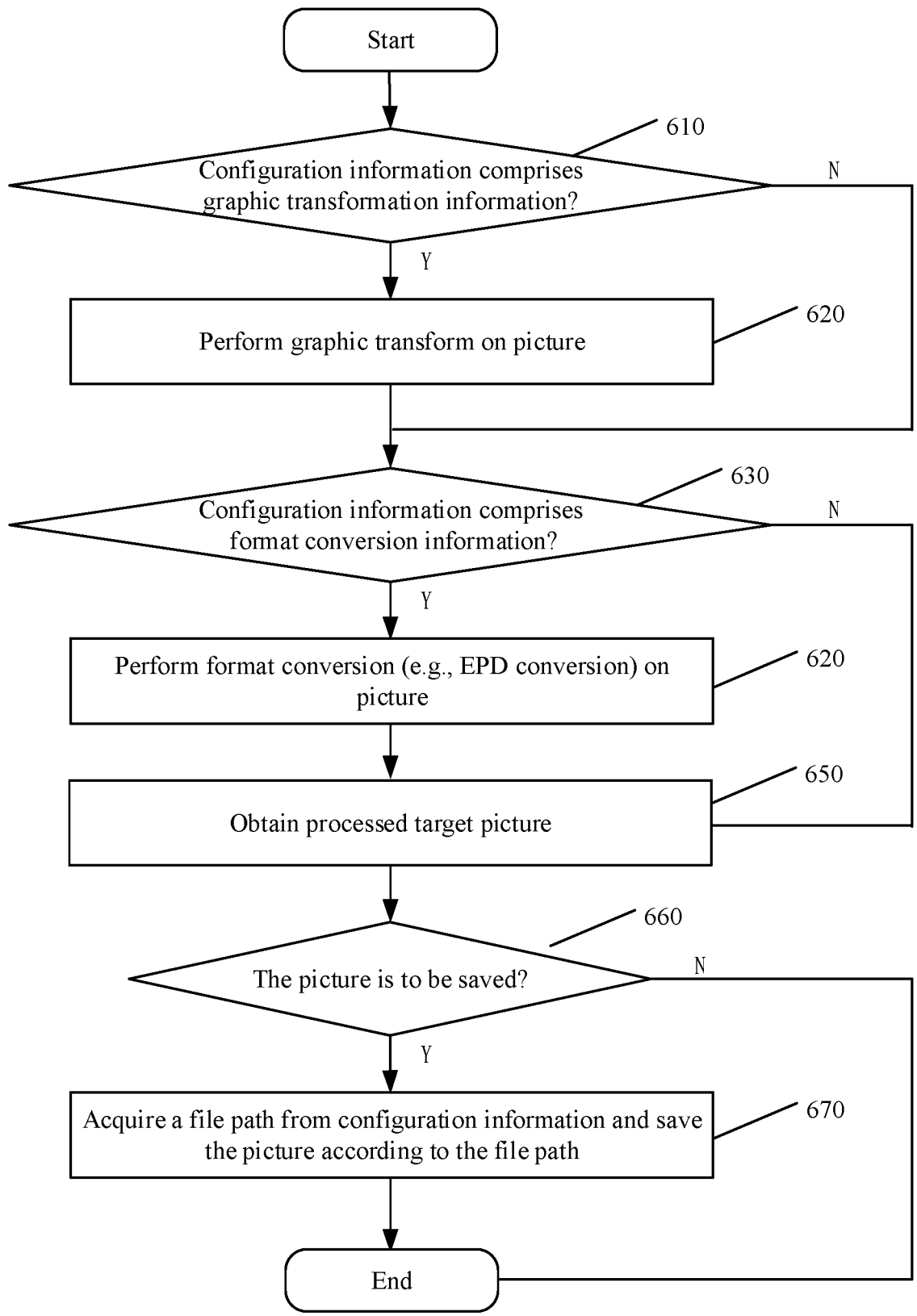
FIG. 6 is a further exemplary flow chart of a method for processing a picture based on configuration information according to an embodiment of this disclosure.

FIG. 6 shows a further exemplary flow chart of a method for processing a picture based on configuration information according to an embodiment of this disclosure.

In step 610, it is determined whether the configuration information contains graphic transformation information. In step 620, in response to the configuration information containing graphic transformation information, graphic transformation, e.g., geometric graphic transformation, is performed on the picture. The graphic transformation may be realized by using a graphic processing tool. The graphic processing tool is for example BufferedImage in the Java.awt package. BufferedImage is an image class with a buffer, and its major function is to load an image to a memory so as to allow convenient operation of the image. BufferedImage may be used to perform image transformation operations such as image zooming, image rotation, image transparency change and so on.

For example, rotation of a preliminary picture may be realized by the following codes.
  if(null !=image.getRotate( )){// if a rotation rule is not null
    a. bi=rotateImage(bi, image.getRotate( );}
  // invoke the rotation rule to rotate the preliminary picture.

In step 630, it is determined whether the configuration information contains format conversion information. In step 640, in response to the configuration information containing format conversion information, format conversion is performed on the picture. A format conversion service may be invoked via a target interface to perform format conversion on the picture. In step 650, a target picture processed according to the configuration information (e.g., graphic transformation information or format conversion information) is obtained.

Optionally, in a scenario where the target picture is to be displayed using an EPD device, different EPD conversions may be required, so the configuration information may contain EPD conversion information. In this case, by defining a target interface, a corresponding EPD conversion service may be invoked from the target interface to perform EPD conversion on the preliminary picture, thereby obtaining the target picture.

For example, the target interface may be defined by the following codes.

public interface EpdHandleService{
String getHandledBase64(String imageBase64);}.
// define a target interface.

By doing this, an electronic device may invoke a target interface by the following codes, thereby realizing graphic transformation.

String result=
epdHandleService.getHandledBase64(imageBase64Str).
// invoke a target interface.

It would be understood that the procedures of graphic transformation and format conversion as shown in FIG. 6 are both exemplary rather than limiting. In other embodiments, the sequence of graphic transformation and format conversion may be inversed. In further embodiments, only one of graphic transformation or format conversion may be performed. In still further embodiments, even no further processing is performed on the generated target picture at all.

Optionally, in step 660, it may be determined whether the picture is to be saved. In step 670, in response to determination that the picture is to be saved, a file path for indicating a cache/saving path of the picture may be extracted from the configuration information, and a picture file of the target picture is saved according to the file path.

Alternatively, in further embodiments, the file path may be used to indicate a storage path of a target service, or an invoking path of the target service. The target service is configured to implement the picture generation method in this disclosure.

Optionally, when multiple drawing instructions are received, according to the number of threads in the configuration information that indicates the number of pictures that can be generated at the same time, multi-thread processing may be enabled through a thread pool to process the multiple drawing instructions simultaneously in multiple threads, thereby generating pictures simultaneously in multiple threads. By supporting multi-thread drawing, the goal of concurrent processing is achieved and the efficiency of picture generation is improved.

Figure 7:
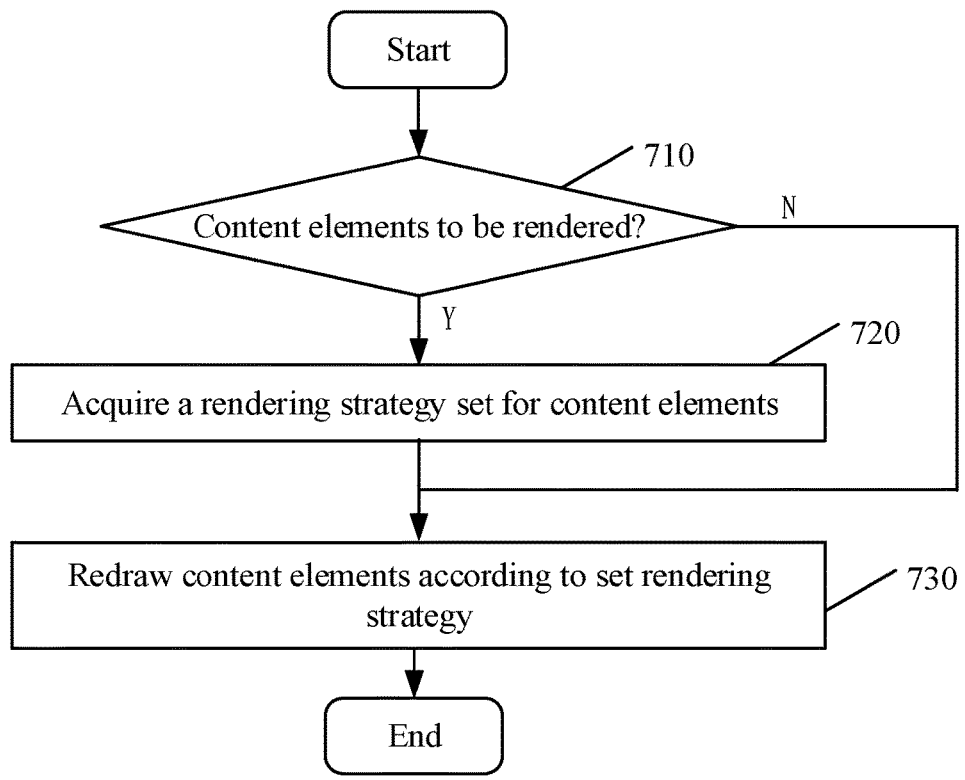
FIG. 7 is an exemplary flow chart of a method for rendering content elements according to an embodiment of this disclosure.

In some embodiments, the picture generation method according to the embodiments of this disclosure may also comprise rendering a target object. The target object may be a content element or a picture. FIG. 7 shows an exemplary flow chart of a method for rendering content elements according to an embodiment of this disclosure.

After drawing of the content elements is completed, in step 710, it is determined whether the content elements are to be rendered. In some embodiments, a content element may comprise a renderer attribute value, and it is determined whether the content element is to be rendered based on presence or absence of the renderer attribute value therein.

In step 720, in response to determining that one or more of the content element to be rendered, a rendering strategy set for the one or more content elements is acquired. The rendering strategy may be set based on a business need of a business for which the target picture is utilized. The rendering strategy may be used to determine how the content elements are presented. Rendering strategies may be specified for the content elements respectively, thereby realizing customization of the rendering of the content elements.

In step 730, the one or more content elements are redrawn according to a respective set rendering strategy to obtain rendered content element pictures. Exemplarily, a renderer corresponding to the content elements may be loaded to render the content elements according to the rendering strategy. The renderer may be employed to expand or change the presentation of elements.

In an example, the business need may comprise changing the color of a cell in a table of a target picture according to content of a digit in the cell. For example, if the digit in the cell is smaller than 10, the cell is displayed in red; if the digit is greater than 10, the cell is displayed in green. For this business need, a corresponding rendering strategy for the table element may be specified in the renderer, i.e., comparing the digit in the cell with 10, and if the digit is smaller than 10, setting the color attribute or color parameter of the cell red; and if the digit is greater than 10, setting the color attribute or color parameter of the cell green. In another example, the business need may be that different colors are required to be applied for different rows in the table of the target picture, or a specific color is required to be applied thereon when a column of the table has a certain value, and so on. For this business need, the rendering strategy may be specified as that setting different color attributes or color parameters for cells in adjacent rows of the table, or comparing the value of a cell in the column of the table with a preset value, and if they are equal, setting the color attribute or color parameter of the cell to be a specific value.

In such an embodiment, in combining the obtained content element pictures to generate the target picture, the content element pictures comprise the rendered content element pictures.

Optionally, after the content elements are drawn, one or more of the content element pictures may be rendered correspondingly.

According to the method in the embodiments of this disclosure, after the content element pictures are combined to generate a preliminary picture, the preliminary picture may be rendered so as to expand or change the presentation of one or some content elements. Exemplarily, a renderer corresponding to the target picture may be loaded to render the preliminary picture.

According to this embodiment, the target object may be rendered by using the renderer after being drawn, which enables secondary processing of the picture contents based on different business needs. Since the drawing and rendering of the target object are performed separately, the business logic processing for rendering is decoupled from the picture drawing procedure, which further enhances the flexibility of the drawing of pictures such that it can better adapt to the user's needs.

Optionally, when it is determined that the content elements are to be rendered, the content elements in the target picture may be rendered by inheriting a Section class and invoking from a first interface a render. For example, when a user desires to fill different rows of the table with different colors, the first interface (defined as SectionRenderer) may be developed in a customized manner.

Exemplarily, the first interface may be defined by the following codes.

public interface SectionRenderer<T extends Section>{
T renderPolicy(T section);}. II define a first interface.

After that, the renderer may be invoked via the first interface to render the graphic elements in the target picture.

Optionally, in the present disclose, elements may also be customized by inheriting the Section class and implementing a draw method. Customization of an element is namely to declare a type of an element, including the definition of the element, which attributes are comprised in the element and so on, and a customized element needs to inherent a base class of content element. For example, customization of a triangle content element needs to declare the definition of a triangle, including attribute information such as the length attribute, color attribute, position attribute, etc. of each side, and the inherited base class is for example the Section class. In this way, after the customized element is added into a template, during the parsing of the template file, it may be determined whether the triangle element inherits Section class in the declaration of customized element. If yes, it will be parsed as a content element and finally drawn on the picture.

Figure 8:
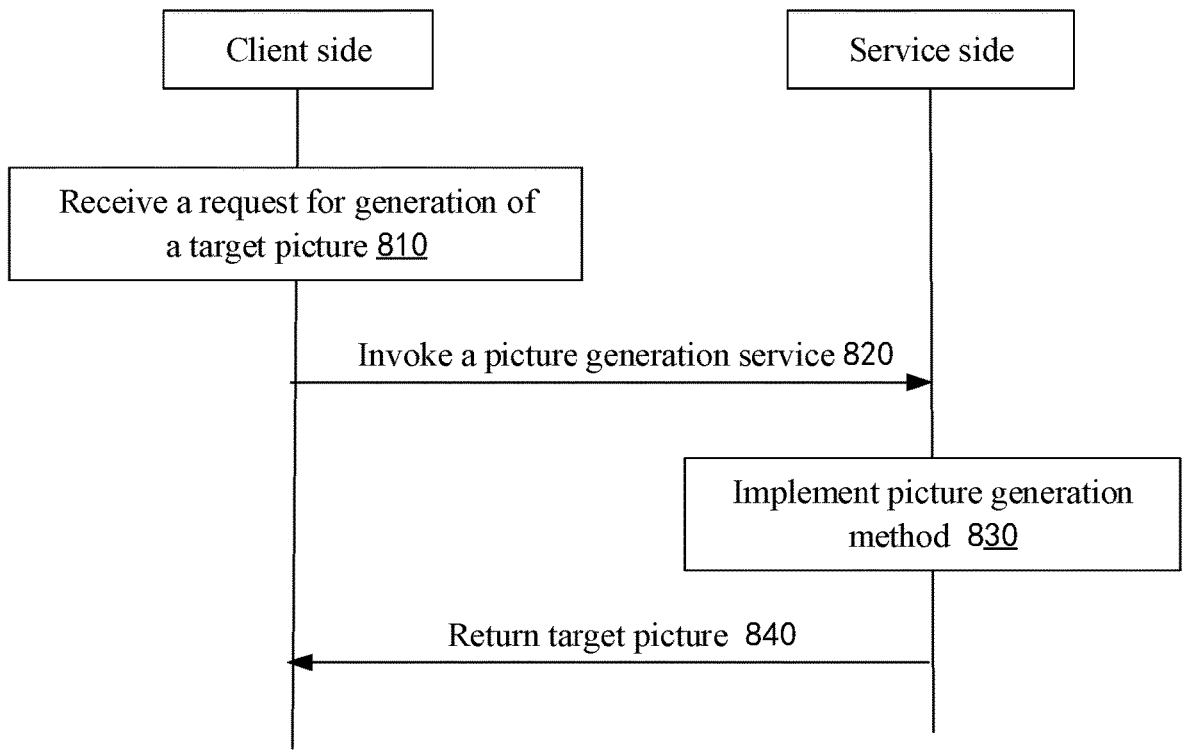
FIG. 8 shows interaction between a client and a service according to an embodiment of this disclosure.

In some embodiment, the method according to the embodiments of this disclosure may be implemented by an electronic device serving as a terminal device. In further embodiments, the method according to the embodiments of this disclosure may also be implemented by a service running on a server independently. FIG. 8 shows interaction between a client and a service in such a scenario. As shown in FIG. 8, the method may comprise steps as follows.

In step 810, the client receives a request for generation of a target picture. In an embodiment, the client may acquire from the request a template file describing a target picture design. Alternatively or additionally, the client may also provide, in response to the request, a designer for picture design to a user so as to enable the user to customize a desired target picture template. The designer may interact with the user via a graphic user interface so that the user can intuitively complete the target picture design. In such an embodiment, after the user completes the design of the picture, the de signer may export the created template as a template file in xml or json format for example. Optionally, the user may further modify the template via the graphic user interface of the designer. Alternatively or additionally, the user may also modify the template by directly modifying the template file.

In step 820, the client invokes a picture generation service at the service side via an interface. The client may transfer the template file for the target picture design to the server via interface invoking.

In step 830, the service implements, in response to service invoking, the picture generation method according to the embodiments of this disclosure to generate the target picture.

In step 840, the service returns the target picture to the client.

Optionally, a target service may be built according to the picture generation method based on springboot framework to achieve encapsulation of the picture generation function. The target service may be in the form of a service interface, or in the form of a dependency.

Optionally, an independent running service may be built according to the picture generation method based on springboot framework, and a drawing interface is provided to the outside in Controller to enable other application services to invoke the picture generation method via the drawing interface, thereby achieving automatic generation of pictures without a visualization interface.

The target service may also be built according to the picture generation method based on springboot framework, and then packed into a jar package which is used as a dependency to provide drawing support for other projects.

In these embodiments, by utilizing the springboot framework for project construction, the target service can be realized as an independently running service or a dependency, which facilitates the integration of the solution according to the embodiments of this disclosure with other applications or application services.

The picture generation method provided in the embodiments of this disclosure has been described in detail with reference to FIGS. 1-8. The embodiments of this disclosure may divide functional modules in an electronic device according to the examples of the picture generation method, e.g., the electronic device may comprise a picture generation apparatus.

Figure 9:
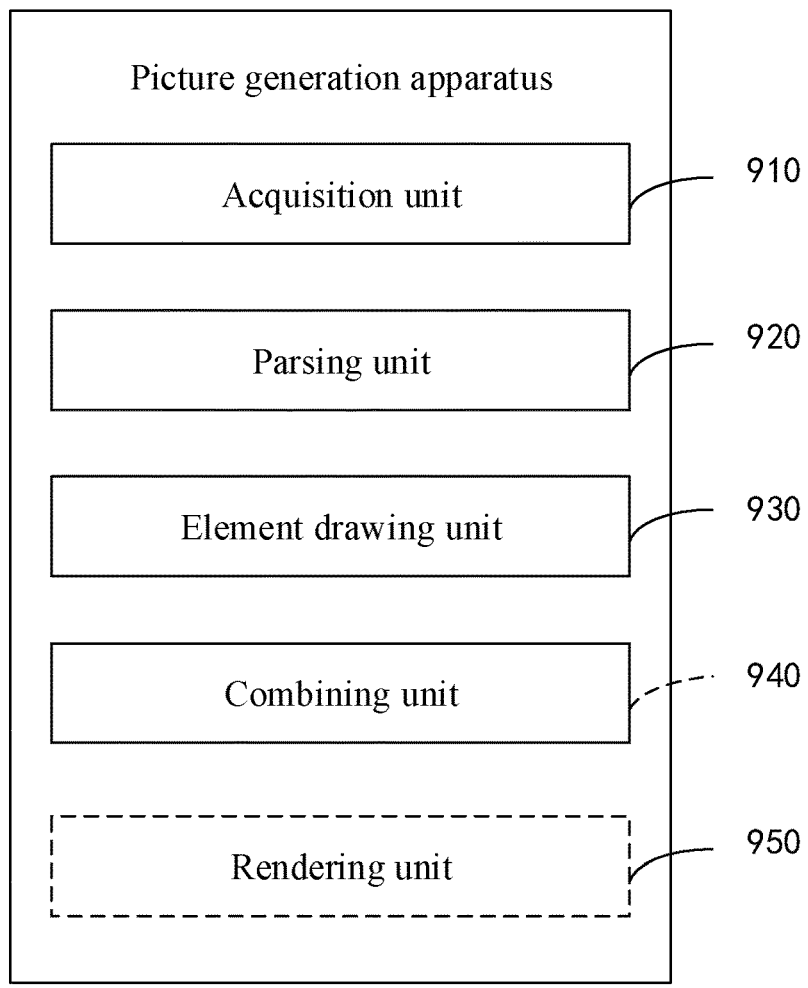
FIG. 9 is an exemplary structure view of a picture generation apparatus according to an embodiment of this disclosure.

FIG. 9 shows an exemplary structure view of a picture generation apparatus according to an embodiment of this disclosure. The picture generation apparatus may implement the picture generation method according to the embodiments of this disclosure. As shown in FIG. 9, the picture generation apparatus comprises: an acquisition unit 910, a parsing unit 920, an element drawing unit 930 and a combining unit 940.

The acquisition unit 910 is configured to acquire a plurality of content elements contained in a design of a target picture. The content elements have respective attribute information.

Optionally, the acquisition unit 910 may acquire configuration information. The configuration information is used for configuring further processing of the preliminary picture. Optionally, the configuration information may comprise format conversion information, e.g., EPD conversion information. The EPD conversion information indicates a data format required by an EPD device for displaying the target picture.

Optionally, the acquisition unit 910 may be configured to receive a template file describing the target picture; and by parsing the template file, content elements and attribute information of the content elements are obtained.

The parsing unit 920 is configured to, in response to a drawing instruction, parse the content elements to obtain one or more graphic elements for each of the plurality of content elements. Each graphic element has an associated graphic parameter that corresponds to the attribute information of a respective content element. The graphic parameter is a parameter for controlling a drawing tool to draw the graphic element, which describes characteristics of the graphic element, including color, position, line thickness, whether it is filled and so on.

The element drawing unit 930 is configured to draw the graphic elements according to the associated graphic parameters to obtain content element pictures for respective content elements. Optionally, the element drawing unit 930 may be configured to draw the graphic elements by using a drawing tool, e.g., Graphics2D, in the Java.awt package.

The combining unit 940 is configured to combine obtained content element pictures to generate the target picture. Optionally, in embodiments where the configuration information is acquired, the combining unit 940 is further configured to use the target picture as a preliminary picture and process the preliminary picture according to the configuration information. Optionally, where the configuration information comprises graphic transformation information, the combining unit 940 may use graphic processing tools in the Java.awt package to perform graphic transformation on the preliminary picture to generate the target picture. Optionally, where the configuration information comprises EPD conversion information, the combining unit 940 may be configured to invoke an EPD conversion service via a target interface to perform graphic transformation on the preliminary picture to generate the target picture.

Optionally, the picture generation apparatus further comprises a rendering module 950. The rendering module 950 is configured to render a target object. The target object comprises at least one of the content elements and the target picture.

Optionally, the rendering module 950 is configured, when the target object is a content element, to load a first renderer to render a graphic element in the content element; when the target object is a target picture, to invoke a second renderer via a first interface to render a graphic element in the target picture.

About the picture generation apparatus in the above embodiments, the specific way in which each module therein executes operations has been described in detail in the embodiments about the picture generation method, which will not be detailed herein for simplicity. In the picture generation apparatus, each function may be provided with one functional module, or two or more functions may be integrated into one functional module. These modules may be implemented either in the form of hardware, or in the form of software functional modules. It should be noted that the modules in the embodiments of this disclosure are divided schematically, which only relates to a division of logic functions, and further divisions may also be used in actual implementation.

Those skilled in the art should easily realize that this disclosure may be implemented in the form of hardware or the combination of hardware and computer software with reference to algorithm steps of each example described in the embodiments disclosed herein. Whether a certain function is executed by hardware or by computer software driving hardware depends on specific applications of the technical solutions and constraint conditions of the design. One skilled in the art may implement the described functions by using different methods for each specific application, but such implementation should not be regarded as going beyond the scope of this disclosure.

Figure 10:
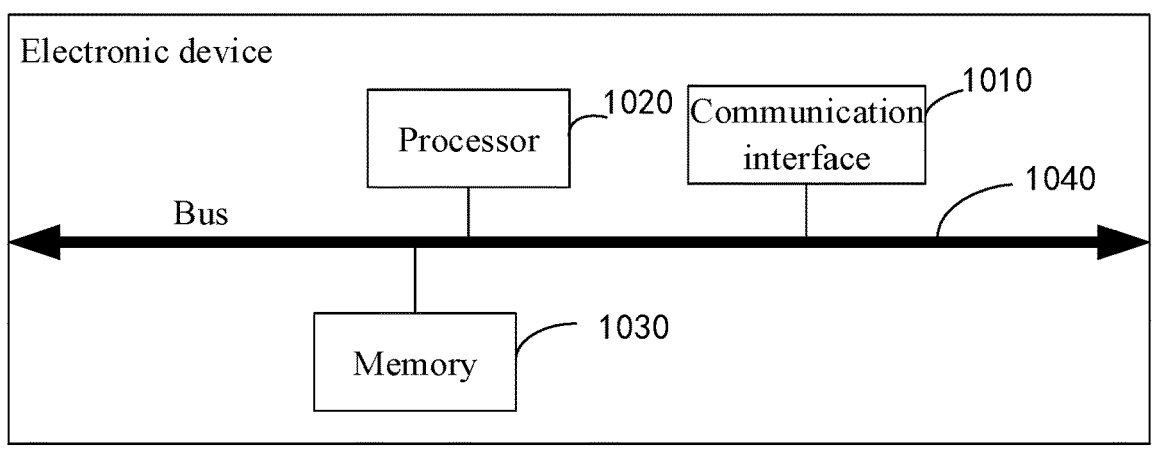
FIG. 10 is a schematic structure view of an electronic device according to an embodiment of this disclosure.

FIG. 10 shows an electronic device for implementing the solutions in the embodiments of this disclosure. The electronic device may comprise a processor 1020, a memory 1030 and a bus 1040 connecting the processor 1020 with the memory 1030. The processor 1020 is configured to execute executable instructions or application program codes stored in the memory 1030, thereby implementing the method according to the embodiments of this disclosure.

The processor 1020 may comprise one or more processing cores, such as a 4-core processor, an 8-core processor, and so on. The processor 1020 may comprise an application processor (AP), a modem processor, a graphics processing unit (GPU), an image signal processor (ISP), a central processing unit (CPU), a controller, a video codec, a digital signal processor (DSP), a baseband processor, and/or a neural-network processing unit (NPU), etc. The processor may comprise different processing units, which processing units may either be independent devices, or be integrated in one or more processors.

The memory 1030 may be a read-only memory (ROM) or other types of static storage devices that can store static information and instructions, a random access memory (RAM) or other types of dynamic storage devices that can store information and instructions, or an electrically erasable programmable read-only memory (EEPROM), a compact disc read-only memory (CD-ROM) or other optical disk storages, optical disk storages (including compact discs, laser discs, optical discs, digital versatile discs, blu-ray discs, etc.), magnetic disk storage media or other magnetic storage devices, or any other medium that can be used to carry or store desired program codes in the form of instructions or data structures and that is accessible by a computer, but is not limited thereto. The memory 1030 may exist independently and be connected with the processor 1020 via the bus 1040. The memory 1030 may be integrated with the processor 1020.

As shown in FIG. 10, the electronic device may also comprise a communication interface 1010. The communication interface 1010, the processor 1020 and the memory 1030 may be coupled with each other, e.g., via the bus 1040. The communication interface 1010 is used for information interaction with other devices, for example, supporting information interaction between the electronic device and other devices.

It should be pointed out that device structures shown in FIG. 10 do not limit the electronic device, but instead, apart from the parts shown in FIG. 10, the electronic device may comprise more or less parts than what are shown in the figure, or be combined with some parts, or comprise different arrangement of the parts.

In another embodiment of this disclosure, a non-transitory computer-readable storage medium is further provided. The non-transitory computer-readable storage medium has executable instructions stored therein, and when the instructions are run on a processor, the processor implements the method according to the embodiments of this disclosure, including the exemplary picture generation method described with reference to FIGS. 1-8 mentioned above.

Those skilled in the art should understand that the embodiments of this disclosure may be implemented as a method, a system or a computer program product. Various embodiments may be implemented by using hardware units, software units or a combination thereof. Examples of hardware units may include devices, components, processors, microprocessors, circuits, circuit elements (for example, transistors, resistors, capacitors, inductors, etc.), integrated circuits, application-specific integrated circuits (ASIC), programmable logic devices (PLD), digital signal processors (DSP), field programmable gate arrays (FPGA), memory cells, logic gates, registers, semiconductor devices, chips, microchips, chipsets and so on. Examples of software units may include software components, programs, applications, computer programs, application programs, system programs, machine programs, operating system software, middleware, firmware, software modules, routines, subprograms, functions, methods, processes, software interfaces, application programming interfaces (API), instruction sets, calculation codes, computer codes, code segments, computer code segments, words, values, symbols, or any combination thereof. The determination about whether an embodiment is implemented using hardware units and/or software units may vary based on any number of factors, such as desired calculation rate, power level, heat resistance, processing cycle budget, input data rate, output data rate, memory resources, data bus speed, and other designs or performance constraints, as desired for a given implementation.

The embodiments of this disclosure are described with reference to the flow charts and/or block diagrams of methods, apparatus (units and systems) and computer program products. It should be understood that each process and/or block in the flow charts and/or block diagrams, and a combination of multiple processes and/or blocks in the flow charts and/or block diagrams may be implemented by computer program instructions. These computer program instructions may be provided to a processor of a general-purpose computer, a special-purpose computer, an embedded computer, or other programmable data processing devices to produce a machine, such that the instructions executed by the processor of the computer or other programmable data processing devices produce an apparatus for realizing the functions specified in one or more processes in the flow charts and/or one or more blocks in the block diagrams.

It should be understood that for the purpose of clarity, the embodiments of the present application are described with reference to different functional units. However, it will be obvious that the functionality of each functional unit may be implemented in a single unit, or in multiple units or as part of other functional units, without departing from the present application. For example, the functionality implemented by a single unit as described may be implemented by multiple different units. Therefore, references to specific functional units are only regarded as references to appropriate units for providing the described functionality, but do not indicate a strict logical or physical structure or organization. Therefore, the present application may be implemented in a single unit or distributed physically and functionally between different units and circuits.

It should be understood that the serial number of the processes do not necessarily imply the order of execution. The order of execution of the processes should be determined based on their functions and inner logics. The serial number of the processes should not limit the implementation procedure of the embodiments of this disclosure in any possible way.

Although this disclosure has been described in combination with each exemplary embodiment, those skilled in the art will understand that many modifications may be made to these embodiments within the scope of the appended claims. Correspondingly, the above description is not intended to limit the scope of this disclosure in any possible way. On the contrary, the scope of this disclosure will be determined with reference to the Claims.

The invention claimed is:

1. A method for picture acquisition, the method being applied to an electronic device and comprising:
in response to a request for acquiring a target picture, building a target service according to a picture generation method, the picture generation method comprising:
acquiring a plurality of content elements contained in a design of the target picture, the content elements having respective attribute information;
in response to a drawing instruction, parsing the content elements to obtain one or more graphic elements for each of the plurality of content elements, wherein each graphic element is a basic graphic drawn by a drawing tool and has an associated graphic parameter, the associated graphic parameter corresponds to the attribute information of a respective content element;
drawing the graphic elements according to the associated graphic parameter of the one or more graphic elements for each of the plurality of content elements to obtain content element pictures for respective content elements;
combining obtained content element pictures to generate a preliminary picture; and
acquiring configuration information and processing the preliminary picture based on the configuration information to generate the target picture,
wherein the configuration information comprises a number of threads indicating the number of content element pictures that the electronic device can generate at the same time and a file path for indicating a cache or saving path of the target picture, a storage path of the target service or an invoking path of the target service,
wherein the configuration information further comprises format conversion information, the format conversion information is Electronic Paper Display (EPD) conversion information, the EPD conversion information indicates a data format required by an EPD device for displaying the target picture,
wherein processing the preliminary picture based on the configuration information to generate the target picture comprises:
converting the preliminary picture into the data format required by the EPD device based on the EPD conversion information, in response to the configuration information comprising the EPD conversion information,
wherein the target service is in a form of a service interface or in a form of a dependency for providing a drawing interface to enable other application services to invoke the picture generation method via the drawing interface, and
wherein the method further comprises invoking the target service by the electronic device to generate the target picture.

2. The method according to claim 1, wherein the converting the preliminary picture into the data format required by the EPD device based on the EPD conversion information comprises:
invoking an EPD conversion service via a target interface to convert the data format of the preliminary picture.

3. The method according to claim 1, wherein after generating the target picture, the picture generation method further comprises:
determining whether the target picture is to be saved;
in response to determining that the target picture is to be saved, extracting from the configuration information the file path; and
saving a picture file of the target picture according to the file path.

4. The method according to claim 1, wherein, prior to combining the obtained content element pictures, the picture generation method further comprises:
determining whether the content elements are to be rendered;
in response to determining that at least one of the content elements is to be rendered, acquiring a rendering strategy set for the at least one content element; and
redrawing the at least one content element according to set rendering strategy to obtain one or more rendered content element pictures,
wherein the combining the obtained content element pictures comprise combining the one or more rendered content element pictures.

5. The method according to claim 4, wherein the rendering strategy is set based on a business need with respect to the target picture.

6. The method according to claim 1, wherein the acquiring the plurality of content elements contained in the design of the target picture comprises:
receiving a template file describing the design of the target picture; and
parsing the template file to acquire the plurality of content elements.

7. The method according to claim 1, wherein the picture generation method further comprises receiving a template file describing the design of the target picture, and
wherein the template file is parsed to acquire the plurality of content elements and the configuration information.

8. The method according to claim 1, wherein the picture generation method further comprises receiving multiple drawing instructions for multiple content elements, and said drawing the graphic elements comprises enabling multi-thread processing through a thread pool according to the number of threads to process the multiple drawing instructions simultaneously in multiple threads so as to draw respective graphic elements for said multiple content elements simultaneously in the multiple threads.

9. An electronic device, comprising:
a processor; and
a memory configured to store executable instructions,
wherein the processor is configured to execute the executable instructions to implement the method according to claim 1.

10. The electronic device according to claim 9, wherein the converting the preliminary picture into the data format required by the EPD device based on the EPD conversion information comprises:
invoking an EPD conversion service via a target interface to convert the data format of the preliminary picture.

11. The electronic device according to claim 9, wherein after generating the target picture, the picture generation method further comprises:
determining whether the target picture is to be saved; and
in response to determining that the target picture is to be saved, extracting from the configuration information the file path, and saving a picture file of the target picture according to the file path.

12. The electronic device according to claim 9, wherein prior to combining the obtained content element pictures, the picture generation method further comprises:
determining whether the content elements are to be rendered;
in response to determining that at least one of the content elements is to be rendered, acquiring a rendering strategy set for the at least one content element; and
redrawing the at least one content element according to set rendering strategy to obtain one or more rendered content element pictures,
wherein the combining the obtained content element pictures comprise combining the one or more rendered content element pictures.

13. The electronic device according to claim 12, wherein the rendering strategy is set based on a business need with respect to the target picture.

14. The electronic device according to claim 9, wherein the acquiring the plurality of content elements contained in the design of the target picture comprises:
receiving a template file describing the design of the target picture; and
parsing the template file to acquire the plurality of content elements.

15. A non-transitory computer-readable storage medium, having executable instructions stored thereon, wherein the executable instructions, when executed by a processor, enable the processor to implement the method according to claim 1.

* * * * *